United States Patent Office 3,161,925
Patented Dec. 22, 1964

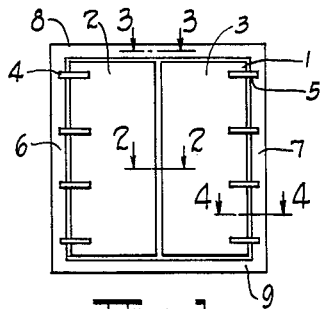
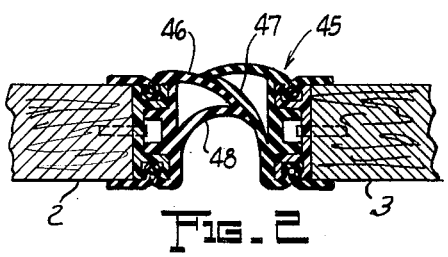
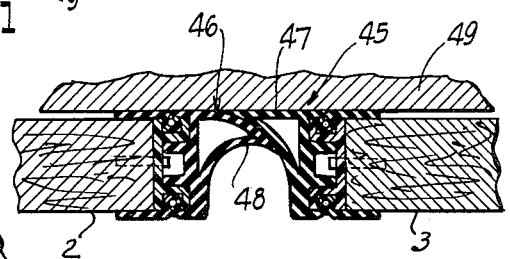
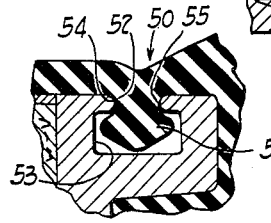
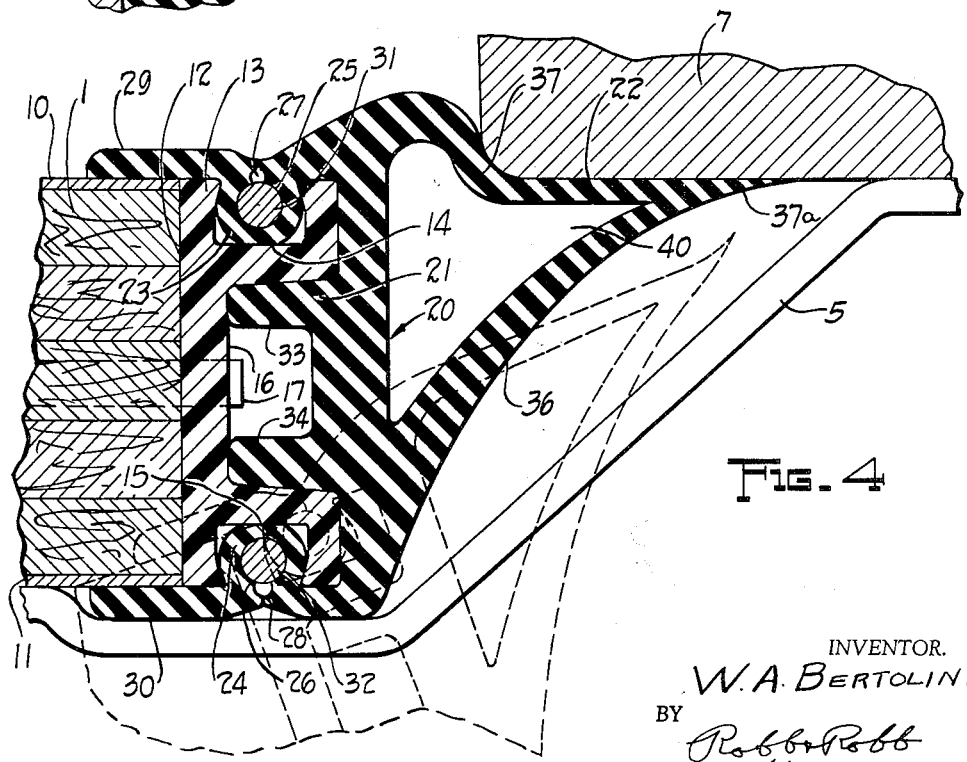

3,161,925
COMPRESSION DOOR SEAL
William A. Bertolini, Seaford, N.Y., assignor to Highway Trailer Industries, Inc., Edgerton, Wis., a corporation of Delaware
Filed Dec. 22, 1960, Ser. No. 77,540
7 Claims. (Cl. 20—69)

This invention relates to seal construction and primarily to seals for containers and specifically for the openings therein.

A specific adaptation of the construction herein, is to shipping and transporting containers such as those comparable to truck or trailer bodies or to such bodies themselves and the doors or openings therein.

In containers which are transported, and which are provided with either hinged or other type of closure member or members, in the nature of doors or the like, it is necessary to seal the interior of the container to prevent the entry of dust, dirt, water or other material and in many cases to virtually preclude the admission of air or moisture because of the contents or climate in which the container is used, and when it is necessary to provide such effective seal, the invention hereof is particularly advantageous.

This invention provides the seal as previously indicated whether the same be called a seal as such, or denoted a gasket, but in any event the same constitutes what may be broadly termed a multi-surface compression seal.

In view of the foregoing, it is a principal object of this invention to provide a seal of the nature herein described, which is most suitable for use with container openings and primarily the edges of doors or like closure members, with the seal being arranged to readily connect to the door edges, be maintained in connection with such door edges, and when the doors are closed provide a substantially air tight sealing engagement therewith.

It is a further object of this invention to provide a seal of the class described, which is suitable for use on the free edges of doors, and in doing so, facilitate the sealing of the door edges, and at the same time enable the doors to be closed in any order selected.

Another object of this invention is to provide a multi-surface compression seal which is provided with novel means to connect the same to door edges or like portions of members which are to be sealed, this arrangement being denoted a mounting section, with a flexible tongue section formed therewith, for engagement with a surface against which the seal is to be effected.

Yet another object of this invention is to provide a multi-surface compression seal, which is provided with a novel mounting section, involving the use of hollow members which are stiffened in their connecting phase, the seal as a whole including further a tongue section which is flexible enough to adapt such section to engagement with similar section or to a rigid surface against which a seal is to be effected.

Other and further objects of the invention will be understood from a consideration of the specification appended hereto and shown in the drawing wherein:

FIGURE 1 is a rear view of a container to indicate generally the position of the seal of the invention hereof as connected thereto.

FIGURE 2 is a plan view, partly in section indicating one position which a pair of inter-engaging seals may assume.

FIGURE 3 is a sectional view taken about on the line 3—3 of FIGURE 1 looking in the direction of the arrows.

FIGURE 4 is an enlarged fragmentary sectional view indicating the manner of fastening the seal to door edges, and its engagement with a door jamb or similar surface.

FIGURE 5 is a fragmentary sectional view of a modified form of manner in which the seal may be fastened to door edges or the like.

Referring now to the drawing, and particularly to FIGURE 1, this figure discloses as an example what may be termed the rear or at least the opening section of a container generally denoted 1, which container in this instance is provided with a pair of hinged doors 2 and 3, supported on hinges 4 and 5 respectively.

As will be further understood from consideration of FIGURE 4 and in which is indicated one of the hinges such as 5, the doors 2 and 3 in this instance are intended to swing outwardly as viewed in FIGURE 1 and thus permit access to the interior of the container 1.

The hinges swing around jambs such as 6 and 7 and for the purposes hereof a header 8 is denoted as the transverse member between the jambs 6 and 7 with a lower header 9 being provided and thus the entire opening is surrounded by a portion of the container against which it is desirable to effect a seal.

Turning now to a consideration of FIGURE 4 which discloses the seal on a very much enlarged scale, in this particular disclosure the door 1 is shown as being built up of a composite plywood interior with a metal sheathing on the inner and outer faces at 10 and 11 respectively.

Suitably fastened to the edge 12 of the door 1, is a seal mounting unit 13 which comprises a metal body having the oppositely arranged grooves 14 and 15 therein with a central section 16 through which section 16 staples such as indicated at 17 may be driven into the edge 12 of the door to thereby retain the seal mounting member 13 in place on such door edge.

The seal itself which is preferably an extruded type of member formed of a resilient material such as some rubber or rubber-like composition, is denoted at 20 generally speaking, and includes a mounting section 21 and a tongue section 22.

The mounting section 21 as is clear from FIGURE 4, includes the inwardly extending gripping elements 23 and 24, which in this instance are formed with exterior round configuration, and interiorly are hollow as providing the openings 25 and 26. The openings 25 and 26 lead by means of the further openings 27 and 28 to the outer surface of the mounting section 13, such mounting section having the flange portions 29 and 30 extending therefrom and integral therewith.

As will be noted from a consideration of the figure now under discussion, the grooves 14 and 15, are of greater width at their interior sections than they are at the openings provided, in order to facilitate the assembly of the seal on the mounting member 13, which involves the insertion of the portions 23 and 24 in such openings with subsequent further insertion of the round members such as 31 and 32, which by their insertion in the hollow portions 25 and 26, will act to stiffen the gripping elements and maintain the same in their connected relationship with the member 13.

The mounting section of the seal is further provided at its central interior portion with the tongues 33 and 34 which extend into the central portion of the member 13 and in conjunction with the groove portions assist in maintaining the seal in position as will be understood.

The tongue section of the seal will next be described, and this includes the portion 36 which tapers to an edge 37a a further portion 37 in conjunction with the mounting section previously described, encloses the generally triangular area 40, and this provides the necessary resilience for the tongue section 22 to perform the sealing operation as will subsequently be explained.

A consideration of FIGURE 4 indicates the normal condition of the seal in dotted lines, with the tongue section in its normal relaxed state and not under compression, with the full line position of said FIGURE 4 indicating the tongue section under the compression necessary to effect the seal in conjunction with the jamb 7.

It will be understood of course that the opposite jamb 6 engages with the seal in a similar manner to that shown in FIGURE 4, and likewise the upper header 8 and lower header 9 similarly are engaged by the seal.

One of the very novel phases of this invention, is the unique manner in which the seals may be caused to be inter-engaged when applied to the free edges of the doors such as 2 and 3, this being illustrated in FIGURES 2 and 3 in greater detail.

In these FIGURES 2 and 3, the seal on the door 3 is denoted 45, and the seal on the door 2 is denoted 46 generally speaking, the appropriate tongue sections of such seals being designated 47 and 48 respectively the seals obviously being fastened to the door edges as is illustrated in FIGURE 4.

With the seals fastened as indicated in position, when the door 3 is first closed, the seal 45 will assume the position as indicated in FIGURE 2 for example at mid-portion of the door and thereafter the door 2 may be closed so as to bring the seal 46 into engagement at the tongue portion 48 thereof with the corresponding tongue portion 47 of the seal 45. The seals would therefore occupy about the positions indicated in FIGURE 2 with the inter-engaged sealing surfaces effectively preventing the entry of air and water, depending upon the rigidity or resiliency of the seals as will be readily understood.

Where the lower edge of the doors may engage the jamb or some other similar surface, such as is indicated at 49, the seals would assume more of a position such as indicated in FIGURE 3, this actually flattening out so to speak, the flexible tongue 47 and the tongue 48 of course likewise.

With the foregoing in mind, it should be pointed out that if the door 2 is closed first, the door 3 may subsequently be closed and bring the seal on the edge thereof in conjunction with the seal on the door 2, and thereby the positions of the respective seals as indicated in FIGURES 2 and 3 would be reversed. Thus it makes no difference in which order the doors are closed, and yet an effective seal is provided. This is a very important feature, since it obviously facilitates the manipulation of doors and obviates the necessity to close them in any particular order.

It should be further explained that whether the doors be hinged or otherwise mounted, they are still susceptible of being sealed at the edges thereof in the manner indicated in the drawing and described herein. The actual composition of the seal itself will be determined by circumstances including the materials available and obviously be arranged to accomplish the purpose herein sought with the most effectiveness.

FIGURE 5, shows a modification of the manner of fastening the mounting section of a seal of the type hereinunder consideration, this mounting section being denoted 50 generally speaking, and including a sort of bulbed portion 51, which is fastened by the neck section 52 to the main body of the mounting portion 50.

The groove in this particular instance is denoted 53 and includes the inwardly extending retaining lips or flanges 54 and 55.

The bulbed section 51 may be of solid rubber and will preferably be of this nature so as to provide for the best gripping action.

In assembling a seal constructed with this type of mounting section 50, it will be understood that by pressure upon the outer surface adjacent the bulbed or bulbous section 51, the same will be caused to slip between the retaining lips or flanges 54 and 55 and the neck section 52 of said bulbous portion will thereafter be gripped between said flanges.

Since the opposite side of the seal at the mounting portion 50 is similarly constructed, and the groove in which the same is received is likewise similarly constructed to that just heretofore described, it will be understood that solid gripping action is obtained with removal being possible but being dependant upon the stiffness of the material from which the seal is made and the relative dimensions of the gripping portions thereof.

The other portions of the seal are constructed as those in FIGURE 4 and the seal otherwise operates the same and provides the same kind of sealing action.

Whereas the seal mounting unit 13 of FIGURE 4 is shown as being comprised of a plastic material, it will be apparent that the same may be formed of an aluminum extrusion, this being indicated as the situation in FIGURE 5 and the means for fastening the extrusion to the door edge may be similar or effected in any preferred manner.

It will also be clear that whereas the retaining lips or flanges 54 and 55 are shown as somewhat more definite inward configuration in FIGURE 5, as compared with the corresponding portions of FIGURE 4, such modification may be effected in FIGURE 4 likewise if found desirable, all to the purpose of best maintaining the seal in connected relationship with the seal mounting unit and thus the door to which the latter is affixed.

I claim:

1. In sealing construction of the class described, in combination, a pair of doors having free edges swingable into adjacent aligned positions and sealing means at said edges, said sealing means comprising substantially identical members each consisting of a mounting section engaged with its corresponding door edge and a single flexible hollow tongue section to engage with the single hollow tongue section of the opposite door edge to effect sealing action therewith irrespective of the closing order of the doors, said mounting section having inwardly extending gripping elements seated in mating portions of the door edge and extending toward one another.

2. In sealing construction of the class described, in combination, a pair of doors having free edges swingable into adjacent aligned positions and sealing means at said edges, said sealing means comprising substantially identical members each consisting of a mounting section engaged with its corresponding door edge and a single flexible hollow tongue section to engage with the single hollow tongue section of the opposite door edge to effect sealing action therewith irrespective of the closing order of the doors, said mounting section having inwardly extending gripping elements seated in mating portions of the door edge and extending toward one another, the tongue section being triangular in cross section and hollow, and separate members to effectively stiffen the gripping elements are removably positioned therein.

3. In sealing construction of the class described, in combination, a pair of doors having free edges swingable into adjacent aligned positions and sealing means at said edges, said sealing means comprising substantially identical members each consisting of a mounting section engaged with its corresponding door edge and a single flexible hollow tongue section to engage with the single hollow tongue section of the opposite door edge to effect sealing action therewith irrespective of the closing order of the doors, the mounting sections including oppositely inwardly extending hollow gripping elements, removable stiffening members are positioned in said elements, and the tongue sections are formed with tapering edge portions.

4. In sealing construction of the class described, in combination, a pair of doors having free edges swingable into adjacent aligned positions and sealing means at said edges, said sealing means comprising substantially identical members each consisting of a mounting section engaged with its corresponding door edge and a single flexible hollow tongue section to engage with the single hollow tongue section of the opposite door edge to effect sealing action therewith irrespective of the closing order of the doors, the mounting sections include a pair of oppositely positioned inwardly extending hollow gripping elements, said elements are seated in grooves in the free edges of the doors, removable stiffening members are seated in the elements, and the tongue section is tapered toward its free edge, is substantially triangular in cross-section, and hollow.

5. In sealing construction of the class described, in combination, a door-like member, seal mounting means carried thereby, and a seal mounted thereon, said seal including a mounting portion connected with the mounting means, and a flexible tongue portion, said tongue portion being hollow, generally triangular in cross-section, and adapted to engage with the edge of the opening to which the closure member is applied and thereby seal the same, said tongue portion being deformed by contact with the edge of said opening, the seal mounting means including a pair of grooves, the mounting section of the seal including inwardly extending gripping elements extending inwardly toward each other and seated in the mounting means, and the tongue section is tapered toward its free edge.

6. In sealing construction of the class described in combination, a door-like member, seal mounting means carried thereby, and a seal mounted thereon, said seal including a mounting portion connected with the mounting means, and a flexible tongue portion, said tongue portion being hollow, generally triangular in cross-section, and adapted to engage with the edge of the opening to which the closure member is applied and thereby seal the same, said tongue portion being deformed by contact with the edge of said opening, the mounting means including portions to receive opposite inwardly extending hollow gripping elements formed in the seal mounting section, stiffening members removably positioned in said elements, and the tongue sections are formed with tapering edge portions.

7. In sealing construction of the class described, in combination, a pair of doors having free edges swingable into adjacent aligned positions and sealing means at said edges, said sealing means comprising substantially identical members each consisting of a mounting section engaged with its corresponding door edge and a single flexible hollow tongue section to engage with the single hollow tongue section of the opposite door edge to effect sealing action therewith irrespective of the closing order of the doors, the mounting sections including a pair of oppositely positioned inwardly extending gripping elements, said elements being seated in grooves in the free edges of the doors, and the tongue section is substantially triangular in cross-section, tapered toward its free edge and is hollow.

References Cited in the file of this patent

UNITED STATES PATENTS

| | | |
|---|---|---|
| 2,797,750 | Van Dette | July 2, 1957 |
| 2,810,603 | Storch | Oct. 22, 1957 |
| 2,811,406 | Moore et al. | Oct. 29, 1957 |

FOREIGN PATENTS

| | | |
|---|---|---|
| 499,762 | Italy | Nov. 15, 1954 |
| 515,885 | Great Britain | Dec. 18, 1939 |
| 752,640 | France | July 24, 1933 |